Figure 1:
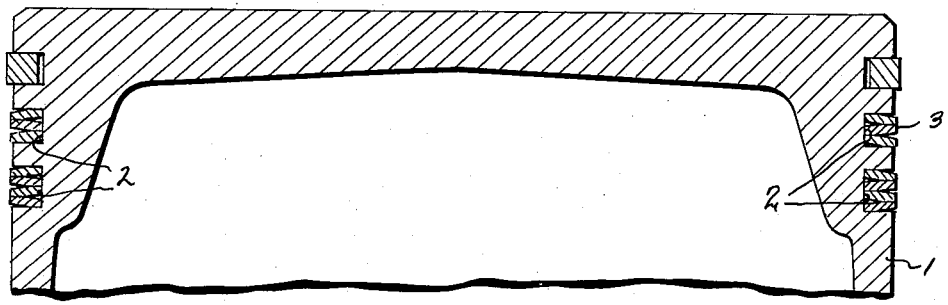

May 30, 1939.  J. J. CARROLL  2,160,379

PISTON RING

Filed March 23, 1937

INVENTOR.
James J. Carroll
BY
ATTORNEY.

Patented May 30, 1939

2,160,379

UNITED STATES PATENT OFFICE 2,160,379

PISTON RING

James J. Carroll, Detroit, Mich.

Application March 23, 1937, Serial No. 132,590

1 Claim. (Cl. 309—45)

This invention relates to piston rings, and more especially to laminated rings wherein a plurality of ring members are used in a single groove in a piston.

Heretofore many forms of laminated rings have been used but in all of them each lamina has been very thin, or relatively so, in cross-section. It is well-known that a relatively thin lamina or ring, when compressed, assumes a dish shape or a distorted shape since the outer portion of the lamina or ring is stretched and the inner portion bulges upon being compressed.

Some manufacturers deliberately make their laminae "dished" as this gives certain advantages. However such "dishing" also leaves much to be desired in a laminated ring. A thin lamina, even though not "dished" in manufacture, as well as a substantially thicker lamina that is originally slightly "dished" in manufacture, becomes noticeably "dished" when compressed into the cylinder wall and further or excessively "dished" by the force of the piston strokes. This excess "dishing" wears a portion of the land away as well as a portion of the contacting segment of the laminae and also adds to the normal expansion of the ring. Thus too great a pressure is exerted against the cylinder wall as the piston reciprocates therein. Hence the friction load is increased and unnecessary wear of the piston wall and of the rings results. This excessive expansion continues until the constant flexing of the laminae of the ring, under the force of the numerous strokes per minute to which each ring is subject, causes the material thereof to reach its elastic limit, after which the ring is no longer efficient. Moreover, the expansive force of such a ring is not constant, as it expands to a greater extent at each end of the piston stroke than at other times. As a result, ring ridges are formed upon the cylinder wall opposite the top and bottom movements of the piston ring.

It is therefore the main object of the present invention to provide a laminated piston ring which resists this "dishing tendency" and thus overcomes the aforesaid disadvantages of the former laminated rings.

The laminated rings heretofore and still used do not completely fill the space between the lands of the piston grooves at any one point. Consequently piston ring flutter or chatter is present, at least to some extent, in all motors equipped therewith, since the rings leave the adjacent land of the piston groove upon the upward and downward strokes of the piston.

In my U. S. Patent #1,982,286, issued November 27, 1934, I have described and claimed a laminated piston ring in which each lamina was "dished" and was provided with a thickened mid-section in order to reduce compression and chatter, but it will be noted that in the structure of my said patent the mid-sections of the laminae do not completely fill the mid-sections of the piston groove in which the ring is mounted, nor is a very large segment of any lamina in contact with another or with a land of a groove at any time.

It is therefore an object of my present invention to provide a laminated piston ring which prevents ring flutter or chatter. I accomplish this by making the mid-portions of the laminae so thick as to actually fill the space between the lands on the piston grooves at their mid-sections and by so shaping the rings that all contacting surfaces are parallel to the plane of the ring. Such a construction does not permit the contacting surfaces of the ring laminae to leave each other or to leave the adjacent lands of the piston grooves in which they are mounted.

With the laminated piston rings heretofore used, but small, narrow ring portions of each lamina presented a contacting line with the lands of the grooves or with adjacent laminae. Thus oil could more easily get behind the rings where it would form a sludge, as a result of the excessive heat of the piston and of the hot gases escaping below the firing ring. This sludge often caused the rings to stick, thus destroying their efficiency. Also due to the small area of the contacting line between lands and segments of the laminae, leakage of carbon-monoxide gas below the rings and into the breather pipe was often quite noticeable. This leakage or "blow-by" is very dangerous, and particularly so in view of the present almost common practice of using high compression motors. Hence it is very important that it should be minimized or effectively prevented.

It is therefore another object of my present invention to provide a laminated piston ring that prevents the piston rings from sticking and that effectively reduces "blow-by".

Numerous other advantages result from the shape of my ring among which are the following:

1. There is less fatigue of the metal in the ring as the compressing thereof is limited.

2. It reduces the wear on the faces of the ring segments and on the faces of the lands.

3. It gives longer life to the ring.

Figure 2:
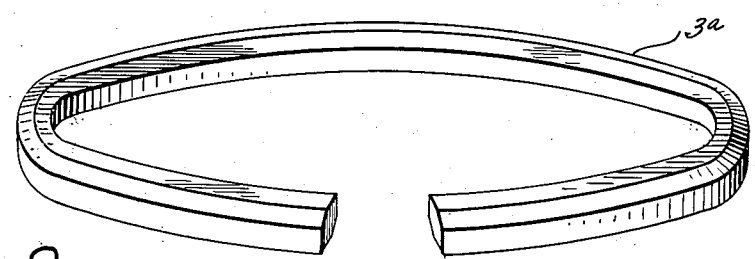
Figure 3:
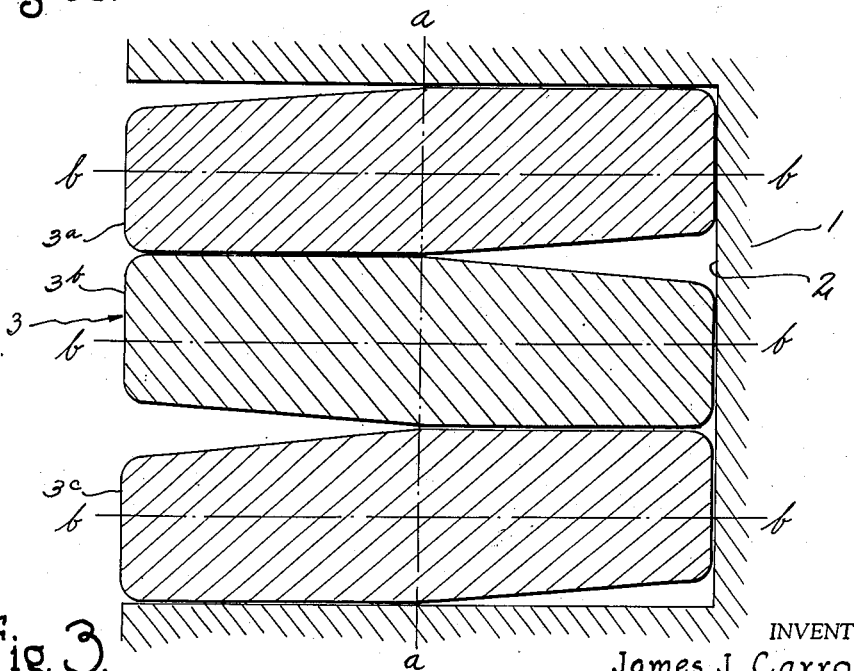

These and other objects and advantages will more clearly appear from the following description of the invention taken in conjunction with the accompanying drawing, in which:

Fig. 1 is a vertical section of the upper portion of a piston equipped with laminated piston rings of the type referred to, and Fig. 2 is an enlarged perspective view of one of the laminae of my invention; and Fig. 3 is a greatly enlarged fragmentary section of a piston wall illustrating one piston groove and a detail of the laminae located therein.

Referring to the drawing, in which similar characters of reference indicate similar parts throughout, 1 indicates a piston of standard form, the upper part of which is provided with ring grooves 2, and in these grooves are shown laminated rings 3, one embodiment of which may be clearly seen from the enlarged section, Fig. 3, wherein a ring having three laminae, marked respectively 3a, 3b, and 3c, is illustrated.

In the laminated form of my ring, two, three or more, but preferably not more than four laminae are used for each piston groove except the firing groove in which the usual firing ring is still used, depending upon the width of the piston groove to be accommodated. However, a single ring shaped similar to my lamina may be used when it fills the actual space between the lands of the groove at substantially the mid-section.

For descriptive purposes a broken line a—a is shown in Fig. 3, dividing the sections of the laminae in half and broken lines b—b are shown, indicating the center lines of each lamina.

In my present invention, I roll each lamina of my rings so that the cross-section of each is thicker at the middle and tapers toward the inner and outer edges thereof, as shown in laminae 3a and 3c. Also the axis of the cross-section of each ring is inclined with reference to the plane of the ring. The lamina 3b is rolled in like manner and is then turned upside down so that the axis of its cross-section is inclined reversely with reference to the plane of the rings and the surfaces of its tapered portions form oppositely directed angles to those formed by the tapered portions of laminae 3a and 3c.

Considering the lamina 3a as an example, it will be noted that, beginning at the intersection with line a—a and continuing to the inner wall of the groove, this lamina contacts the upper land of the piston groove 2 as this portion of it was rolled parallel to its center line b—b, as was also its lower annular bearing surface. The remaining upper and lower surfaces of the lamina are disposed at an angle to the center line b—b, said angle being sufficient to provide channels to permit ventilation for cooling the rings, also sufficient to reduce the friction area and to provide an oil channel for improved lubrication. The degree of taper of the non-bearing surfaces may vary but I prefer a taper of approximately four to six degrees.

As shown, each lamina has an upper bearing surface parallel to a lower bearing surface. The peripheral edges of each lamina are shaped at right angles to the center line b—b. In other words, they are parallel to the transverse axis a—a. The corners of each lamina are preferably rounded as shown to reduce friction.

The non-contacting segmental portions do not necessarily have to be parallel, as any suitable formation for permitting ventilation and for reducing the area of the peripheral surfaces may be used.

In my present invention, I form each lamina thicker, especially in the midle of the cross-section, than are the lamina shown in my said former patent and I size them so that their midsections entirely fill the mid-portion of the space between the upper and lower lands of the piston groove they are to accommodate. This may be seen by referring to Fig. 3, where at the line a—a, it will be seen that the groove is entirely filled. I allow a maximum of five-ten-thousandths of an inch (.0005) clearance for each lamina, this being required for heat expansion.

Thus it will be seen that the laminae are not dished and that their central thickness as well as the large contacting surfaces substantially resist the tendency to dish upon compression thereof and provide a seal such as to effectively prevent "blow-by". This results in increased compression and lower oil and fuel consumption.

I claim:

A piston ring assembly comprising a plurality of ring elements, each element having its upper face and its lower face each including a portion forming an annular flat surface which is parallel to the plane of the ring and adapted to constitute a bearing surface, one of said surfaces being contiguous with one peripheral wall and the other surface contiguous with the other peripheral wall, and the remaining portion of both the upper face and the lower face of the element forms a surface which is not parallel with the plane of the ring in order to provide a cross-sectional shape which tapers from the center region towards the peripheral walls wherein adjacent elements contact with each other through the intermediary of the annular flat surface which is parallel to the plane of the ring and wherein the distance between the upper and lower annular flat surfaces which are parallel to the plane of the ring is so chosen that the plurality of rings extend for the full distance between the upper and lower walls of the accommodating piston groove with which the assembly is adapted to be associated.

JAMES J. CARROLL.